US008933163B2

(12) United States Patent
Krebs et al.

(10) Patent No.: US 8,933,163 B2
(45) Date of Patent: Jan. 13, 2015

(54) POLYURETHANE HOT-MELT ADHESIVE PRODUCED FROM POLYACRYLATES AND POLYESTERS

(71) Applicant: Henkel AG & Co. KGaA, Duesseldorf (DE)

(72) Inventors: Michael Krebs, Hilden (DE); Uwe Franken, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/839,302

(22) Filed: Mar. 15, 2013

(65) Prior Publication Data
US 2013/0210989 A1 Aug. 15, 2013

Related U.S. Application Data

(63) Continuation of application No. PCT/EP2011/066095, filed on Sep. 16, 2011.

(30) Foreign Application Priority Data

Oct. 1, 2010 (DE) .................... 10 2010 041 854

(51) Int. Cl.
*C08F 8/30* (2006.01)
*C08F 283/04* (2006.01)
*C08G 18/08* (2006.01)
*C08G 18/28* (2006.01)
*C08G 18/42* (2006.01)
*C08L 51/00* (2006.01)
*C08L 67/00* (2006.01)
*C08L 75/00* (2006.01)
*C09J 133/06* (2006.01)
*C08G 18/10* (2006.01)
*C08G 18/48* (2006.01)
*C08G 18/71* (2006.01)
*C09D 175/08* (2006.01)
*C09J 167/02* (2006.01)
*C08L 33/12* (2006.01)
*C08L 67/02* (2006.01)

(52) U.S. Cl.
CPC .............. *C09J 133/06* (2013.01); *C08G 18/10* (2013.01); *C08G 18/4238* (2013.01); *C08G 18/4825* (2013.01); *C08G 18/71* (2013.01); *C09D 175/08* (2013.01); *C09J 167/02* (2013.01); *C08G 2170/20* (2013.01); *C08L 33/12* (2013.01); *C08L 67/02* (2013.01)

USPC .......... 524/507; 524/539; 524/589; 524/590; 525/123; 525/455

(58) Field of Classification Search
USPC ........... 524/507, 589, 590, 539; 525/123, 455
See application file for complete search history.

(56) References Cited

U.S. PATENT DOCUMENTS

| 5,021,507 | A | 6/1991 | Stanley et al. | |
| 5,162,457 | A | 11/1992 | Hansel et al. | |
| 5,441,808 | A | 8/1995 | Anderson et al. | |
| 5,880,167 | A * | 3/1999 | Krebs et al. | 521/155 |
| 6,280,561 | B1 | 8/2001 | Mcinnis et al. | |
| 2003/0045636 | A1 | 3/2003 | Krebs et al. | |
| 2004/0259968 | A1 * | 12/2004 | Krebs | 521/170 |
| 2010/0210748 | A1 * | 8/2010 | Leimenstoll et al. | 521/159 |

FOREIGN PATENT DOCUMENTS

| DE | 4035280 | 5/1992 |
| EP | 0484761 | 5/1992 |
| EP | 1036103 | 7/2008 |
| WO | 9115530 | 10/1991 |
| WO | 9928363 | 6/1999 |
| WO | 0146330 | 6/2001 |
| WO | 2008076146 | 6/2008 |

OTHER PUBLICATIONS

International Search Report issued in connection with International Patent Application No. PCT/EP2011/066095 mailed Nov. 11, 2011. EN/ISO 2555.

* cited by examiner

Primary Examiner — Patrick Niland
(74) Attorney, Agent, or Firm — James E. Piotrowski

(57) ABSTRACT

A solvent-free moisture-curing polyurethane hot-melt adhesive composition, in which the adhesive comprises the following components: 20 to 85 wt % of a polyurethane prepolymer with free isocyanate groups produced from at least one polyol from the group of polyether polyols, polyester polyols, polyalkylene polyols and mixtures thereof with an excess of at least one polyisocyanate, the prepolymer having a monomeric diisocyanate content of below 1 wt %, 4 to 40 wt % of at least one acrylate copolymer with a molecular weight of below 60,000 g/mol, 3 to 35 wt % of a thermoplastic polyester with a number-average molecular weight (MN) of below 6000 g/mol, which comprises fewer than 1.4 NCO-reactive groups, and 0 to 25 wt % of at least one additive from the group of catalysts, resins, plasticizers, fillers, pigments, stabilizers or adhesion promoters, the sum of the constituents being equal to 100 wt %.

13 Claims, No Drawings

POLYURETHANE HOT-MELT ADHESIVE PRODUCED FROM POLYACRYLATES AND POLYESTERS

The invention relates to polyurethane adhesives having good initial strength and low application viscosity that additionally contain polyacrylates. These adhesives are furthermore intended to contain nonreactive polyesters.

Hot-melt adhesives are commonly known. They can be nonreactive thermoplastic adhesives; reactive adhesives are also known. They are often systems that crosslink via NCO groups. It is known that with a higher application viscosity, an improved initial strength of the bond can be obtained. If the viscosity is lowered by adding plasticizers, cohesion is generally worsened. If the application temperature is raised, the adhesive and substrate experience greater stress. The energy expenditure is also higher. Because these systems are reactive, the impact of monomeric diisocyanates is critical in the context of higher-temperature processing. If the molecular weight of the polymer is increased by reaction with chain-lengthening substances, the initial strength of the adhesive bond rises but so does the viscosity. It is, however, a desirable goal to obtain low viscosity and a low processing temperature.

WO 91/15530 describes a hot-melt adhesive that contains as a constituent an NCO-group-containing prepolymer as well as a polyether-polyester that comprises no NCO groups. The prepolymer is manufactured in usual fashion, and it is therefore known that these prepolymers contain a significant proportion of monomeric isocyanates. The block polyether-polyesters are described as reaction products of diols and dicarboxylic acids; they therefore react with the NCO groups of the prepolymer. A decrease in functional groups is not described.

WO 01/46330 describes hot-melt adhesives that encompass a reactive polyurethane prepolymer as well as a further prepolymer that is made up of polyether-polyester polyols, the latter having been completely reacted with an excess of diisocyanates to yield NCO prepolymers.

DE 4035280 describes hot-melt adhesives that contain more than 70% prepolymers having NCO groups based on polyester diols, as well as up to 30% polyesters that comprise only up to 0.5 active hydrogen atoms per molecule.

WO 99/28363 describes hot-melt adhesives that encompass a reactive polyurethane prepolymer as well as a further acrylate prepolymer having NCO groups, in addition to various additives. Crosslinking or non-crosslinking further polyesters are not described.

The adhesives described in the existing art have a variety of disadvantages. As a result of the reaction with an excess of monomeric isocyanates, the latter are still contained in the adhesive and advantageously lower the viscosity. It is known, however, that the monomers transition into the atmosphere upon processing, so that problems with occupational safety arise. Such monomers therefore should be decreased. In addition, a reaction of the reactive groups of polyfunctional polymers with the prepolymers causes an increase in molecular weight and thus an elevation in viscosity. This then results in poorer processing of the adhesives.

An object of the present invention is therefore to make available a hot-melt adhesive that can be utilized in low-monomer form, but nevertheless exhibits a low application viscosity. The adhesive is furthermore intended to ensure a rapid buildup of adhesion upon bonding.

The object is achieved by a solvent-free moisture-curing polyurethane hot-melt adhesive composition, in which the adhesive comprises the following components: a) 20 to 85 wt % of a polyurethane prepolymer having free isocyanate groups produced from at least one polyol from the group of polyether polyols, polyester polyols, polyalkylene polyols, and mixtures thereof and a molar excess of at least one polyisocyanate, the prepolymer having a monomeric diisocyanate content below 1 wt %, b) 4 to 40 wt % of at least one acrylate (co)polymer having a molecular weight below 60,000 g/mol, c) 3 to 35 wt % of a thermoplastic polyester having a number-average molecular weight ($M_N$) below 6000 g/mol which comprises fewer than 1.4 NCO-reactive groups, and d) 0 to 25 wt % of at least one additive from the group of catalysts, resins, plasticizers, fillers, pigments, stabilizers or adhesion promoters, the sum of a) to d) being equal to 100 wt %.

The prepolymers that have isocyanate groups and are suitable according to the present invention can be manufactured using methods known per se, by reacting polyols with an excess of di- and/or triisocyanates. The formation of undesired high-molecular-weight or branched byproducts can be reduced by way of the quantity of isocyanates. In an embodiment, it is thereby possible to produce prepolymers that have a polyol backbone and carry terminal reactive NCO groups.

A plurality of polyfunctional alcohols are suitable in the context of the invention for synthesizing the prepolymers. They are intended to comprise 2 to 10, in particular 2 to 3 OH groups per molecule. The polyols having multiple OH groups can be ones that carry terminal OH groups, or they can be polyols that comprise OH groups distributed laterally along the chain. The OH groups are those that can react with isocyanates. These can be primary, secondary, or tertiary OH groups, but primary or secondary OH groups are preferred. Examples of suitable polyols are those based on polyethers, on polyesters, or on polyalkylenes.

Polyether polyols, constituting reaction products of low-molecular-weight polyfunctional alcohols with alkylene oxides, are particularly suitable. The alkylene oxides preferably have 2 to 4 carbon atoms. The reaction products of ethylene glycol, propylene glycol, the isomeric butanediols, hexanediols, or 4,4'-dihydroxydiphenylpropane with ethylene oxide, propylene oxide, butylene oxide, or mixtures of two or more thereof are, for example, suitable. Also suitable are the reaction products of polyfunctional alcohols such as glycerol, trimethylolethane or trimethylolpropane, pentaerythritol, or sugar alcohols with the aforesaid alkylene oxides to yield polyether polyols. Further polyols that are suitable in the context of the invention are produced by polymerization of tetrahydrofuran (poly-THF). The polyether polyols are manufactured in a manner known to one skilled in the art, and are commercially obtainable.

Among the aforementioned polyether polyols, the reaction products of low-molecular-weight alcohols with propylene oxide, under conditions in which secondary hydroxyl groups form in part, are particularly suitable.

Polyester polyols are furthermore suitable. Polyester polyols of this kind preferably encompass the reaction products of polyfunctional, by preference difunctional alcohols, optionally together with small quantities of trifunctional alcohols, and polyfunctional, by preference difunctional and/or trifunctional carboxylic acids. Instead of free polycarboxylic acids, the corresponding polycarboxylic acid anhydrides or corresponding polycarboxylic acid esters with alcohols having by preference 1 to 3 carbon atoms can also be used. Hexanediol, butanediol, propanediol, ethylene glycol, 1,4-hydroxymethylcyclohexane, 2-methyl-1,3-propanediol, triethylene glycol, tetraethylene glycol, polyethylene glycol, dipropylene glycol, polypropylene glycol, dibutylene glycol, and mixtures of such alcohols are particularly suitable for manufacturing polyester polyols of this kind.

The polycarboxylic acids can be aliphatic, cycloaliphatic, aromatic or heterocyclic or both. They can optionally be substituted, for example with alkyl groups, alkenyl groups, ether groups, or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, glutaric acid anhydride, maleic acid, maleic acid anhydride, fumaric acid, dimer fatty acid or trimer fatty acid, or mixtures of two or more thereof. Citric acid or trimellitic acid are preferably suitable as tricarboxylic acids. The aforesaid acids can be used individually or as mixtures of two or more thereof. Such OH-functional polyesters are known to one skilled in the art and are commercially obtainable. Polyester polyols comprising two or three terminal OH groups are particularly suitable.

Polyester polyols of oleochemical origin can also be used, however. Such polyester polyols can be manufactured, for example, by complete ring opening of epoxidized triglycerides of an at least partly olefinically unsaturated fatty-acid-containing fat mixture with one or more alcohols having 1 to 12 carbon atoms, and subsequent partial transesterification of the triglyceride derivatives to yield alkyl ester polyols having 1 to 12 carbon atoms in the alkyl residue. An example thereof is also castor oil.

Polycarbonate polyols are additional suitable polyester polyols. Polycarbonates can be obtained, for example, by the reaction of diols, such as propylene glycol, butanediol-1,4 or hexanediol-1,6, diethylene glycol, triethylene glycol, or tetraethylene glycol, or mixtures of two or more thereof, with diaryl carbonates, for example diphenyl carbonate, or phosgene. A further group of polyols usable according to the present invention encompass polyesters based on ε-caprolactone. Polyester polyols that contain one or more urethane groups in the molecule chain are also suitable.

Further suitable polyols are, for example, alkylene polyols having 2 to 6 OH groups per molecule. Alcohols having primary and secondary OH groups are preferably suitable. Included among the suitable aliphatic alcohols are, for example, diols such as ethylene glycol, propylene glycol, butanediol-1,4, pentanediol-1,5, hexanediol-1,6, heptanediol-1,7, octanediol-1,8, 1,10-decanediol, 1,12-dodecanediol, dimer fatty alcohol, and higher homologs or isomers thereof. Also suitable are higher-functional alcohols such as, for example, glycerol, trimethylolethane, pentaerythritol, and/or trimethylolpropane. These can be contained at least in portions. Suitable aliphatic alcohols have a molecular weight from 60 to 400 g/mol. Linear alcohols having 2 to 30 carbon atoms that comprise two to four OH groups are, however, used in particular.

The polyols can be used individually or in a mixture. Mixed polyurethane prepolymers can also form.

Polyether polyols and/or polyester polyols having a molecular weight from 200 to 5000 g/mol, by preference 400 to 4000 g/mol (number-average molecular weight $M_N$, measured via GPC) are, for example, suitable. Preferred polyols are intended to have 2 or 3 OH groups in the molecule; diols, particularly preferably polyether-based, are particularly suitable.

Monomeric isocyanates "suitable" for the present invention are understood to be those having two or three NCO groups in the molecule. These are preferably the known aliphatic, cycloaliphatic, or aromatic monomeric isocyanates.

Suitable isocyanates are selected from those having a molecular weight from 160 to 500 g/mol, for example from the group of 1,5-naphthylene diisocyanate, 4,4'-diphenylmethane diisocyanate (MDI), hydrogenated or partly hydrogenated MDI (H12 MDI, H6MDI), xylylene diisocyanate (XDI), tetramethylxylylene diisocyanate (TMXDI), di- and tetraalkylenediphenylmethane diisocyanate, 4,4'-dibenzyl diisocyanate, 1,3-phenylene diisocyanate, 1,4-phenylene diisocyanate, 1-methyl-2,4-diisocyanatocyclohexane, 1,6-diisocyanato-2,2,4-trimethylhexane, 1,6-diisocyanato-2,4,4-trimethylhexane, chlorinated and brominated diisocyanates, phosphorus-containing diisocyanates, tetramethoxybutane-1,4-diisocyanate, naphthalene-1,5-diisocyanate (NDI), butane-1,4-diisocyanate, hexane-1,6-diisocyanate (HDI), dicyclohexylmethane diisocyanate, tetramethylene, hexamethylene, undecane, dodecamethylene, 2,2,4-trimethyl-hexane-2,3,3-trimethylhexamethylene diisocyanate, cyclohexane-1,4-diisocyanate, ethylene diisocyanate, methylenetriphenyltriisocyanate (MIT), phthalic acid bis-isocyanatoethyl ester, diisocyanates having reactive halogen atoms, such as 1-chloromethylphenyl-2,4-diisocyanate, 1-bromomethylphenyl-2,6-diisocyanate, 3,3-bis-chloromethyl ether-4,4'-diphenyl diisocyanate. Further usable diisocyanates are trimethylhexamethylene diisocyanate, 1,4-diisocyanatobutane, 1,12-diisocyanatododecane, and dimer fatty acid diisocyanate, lysine diisocyanate, 4,4-dicyclohexylmethane diisocyanate, 1,3-cyclohexane diisocyanate or 1,4-cyclohexane diisocyanate.

Suitable diisocyanates having two NCO groups of differing reactivity are selected from the group of aromatic, aliphatic, or cycloaliphatic diisocyanates. Examples of particularly suitable aromatic diisocyanates having differently reactive NCO groups are the isomers of toluylene diisocyanate (TDI), naphthalene-1,4-diisocyanate, 1,3-phenylene diisocyanate, or 2,4'-diphentylmethane diisocyanate (2,4'-MDI). Examples of aliphatic diisocyanates having differently reactive NCO groups are 1,6-diisocyanato-2,2,4-trimethylhexane, 1,6-diisocyanato-2,4,4,-trimethylhexane, and lysine diisocyanate.

Examples of suitable cycloaliphatic diisocyanates having differently reactive NCO groups are, for example, 1-isocyanatomethyl-3-isocyanato-1,5,5-trimethylcyclohexane (isophorone diisocyanate, IPDI), 1-methyl-2,4-diisocyanatocyclohexane, or 1,4-diisocyanato-2,2,6-trimethylcyclohexane (TMCDI).

Suitable trifunctional isocyanates are those isocyanates that are produced by trimerization or oligomerization of diisocyanates or by reacting diisocyanates with trifunctional hydroxyl-group-containing compounds having a molecular weight below 300 g/mol. Examples thereof are trimerization products of the isocyanates HDI, MDI, or IPDI.

The prepolymers suitable according to the present invention are manufactured from the above-mentioned polyols and polyisocyanates using known methods, the isocyanates being reacted at a stoichiometric excess with the polyols. This can occur, for example, at room temperature; elevated temperatures can also be utilized. The starting compounds generally react spontaneously with one another, but it may also be necessary to add catalysts, such as organometallic compounds or organic amino compounds. The known methods can furthermore be used to remove unreacted monomeric polyisocyanates. This can be done, for example, by precipitating or capturing the monomeric isocyanates. A preferred embodiment removes the unreacted monomers by distilling off the monomers under vacuum, for example in a thin-film evaporator.

In another preferred embodiment, asymmetrical diisocyanates are used to manufacture the prepolymers. It is thereby possible to utilize the selective reaction of the monomeric asymmetrical diisocyanates with the diols, so that under suitable stoichiometric conditions and with suitable reaction management, the reaction product contains only a small proportion of monomeric, low-molecular-weight diisocyanates.

The low-monomer polyurethane prepolymers usable according to the present invention are intended to have a concentration of monomeric, unreacted polyisocyanates below 1 wt %, in particular less than 0.1 wt % (based on the prepolymer). The prepolymers have a molecular weight from 300 to 6000 g/mol, by preference less than 4000, in particular less than 2000 g/mol. The number of NCO groups per molecule is 2 or 3, in particular 2 NCO groups. The prepolymers preferably contain exclusively reacted aromatic diisocyanates.

According to the present invention, the hot-melt adhesive is additionally suitable to contain poly(meth)acrylates and copolymers thereof. These are, for example, copolymers of ethylenically unsaturated compounds such as linear or branched C1 to C18 alkyl esters of (meth)acrylic acid; methacrylic acid, crotonic acid, maleic acid; esters of (meth) acrylic acid with glycol ethers, such as methoxyethanol, ethoxyethanol, polyethylene glycol monoethers; vinyl esters such as vinyl acetate, vinyl propionate, or vinyl esters of branched monocarboxylic acids; or vinyl aromatics. These are intended to comprise no groups reactive with isocyanates.

In a preferred embodiment, these poly(meth)acrylates have active hydrogen groups in the form of hydroxyl groups, primary or secondary amino groups, so that these polymers can become chemically incorporated into the polymer matrix of the hot-melt adhesive. The low-molecular-weight polymers are usually manufactured by radical polymerization resp. copolymerization of the aforesaid monomers. In order to incorporate the active hydrogen groups, hydroxyethyl (meth) acrylate, hydroxypropyl (meth)acrylate, hydroxybutyl (meth)acrylate, or esters of acrylic acid or of methacrylic acid with glycol oligomers or polymers such as e.g. di-, tri-, tetra-, and/or polyethylene glycol can be copolymerized with the monomers recited above. Instead of the aforesaid hydroxyfunctional (meth)acrylates, the corresponding amino-functional comonomers can also be additionally used. Poly(meth) acrylates of this kind can be reacted with diisocyanates in methods such as those already described above, and then form prepolymers having NCO groups. These can then be added to the polyurethane prepolymer.

Such poly(meth)acrylates are intended in particular to have a number-average molecular weight ($M_N$) below 60,000 g/mol, in particular from 10,000 to 40,000 g/mol. Nonreactive poly(meth)acrylates are preferably used. Poly(meth) acrylates that have a $T_g$ (glass transition temperature, measured by DSC) above 30° C. are particularly suitable. These polymers can be contained in the adhesive in quantities from 4 to 40 wt %, in particular from 5 to 20 wt %.

According to the present invention, the hot-melt adhesive is intended to contain at least one thermoplastic polyester. The molecular weight of the thermoplastic polyester is intended to be less than 6000 g/mol. According to the present invention, the polyesters must have only a low functionality and are in particular intended not to react with the prepolymer. The quantity is selected so that no double-ended chain lengthening of the prepolymers occurs. These polyesters are intended to contain on average less than 1.4 groups reactive with NCO groups per polymer chain, preferably less than 1; in particular they are intended to be substantially free of NCO-reactive groups.

Appropriate polyesters are the known polyesters based on reaction products of polyfunctional, by preference difunctional alcohols, optionally together with small quantities of trifunctional alcohols, and polyfunctional, by preference difunctional and/or trifunctional carboxylic acids. Suitable ester derivatives can also be used. The polyesters known per se can be used. Polyesters based on aliphatic carboxylic acids are particularly suitable, particularly preferably predominantly linear polyesters.

The functionality of the thermoplastic polyesters is intended to be decreased. This can be achieved by a variety of actions. For example, the number of OH- or COOH-containing terminal groups can be decreased already during synthesis, by adding monovalent alcohols. Another procedure reduces the number of functional groups of the polyesters by polymer-analogous reactions.

For example, it is possible to decrease OH groups or COOH groups by reacting with carboxylic acid halides. The reaction can be achieved easily thanks to the high reactivity of such derivatives. In another procedure, functional groups that are present are reacted with esters or orthoesters. By removing the volatile reaction products, a reaction can be assisted and the number of reactive groups can be decreased. In a further suitable procedure, functional groups that are present are reacted with carboxylic acid anhydrides. It is optionally also possible to add portions of solvents in order to facilitate the reaction. These can then be removed again, optionally together with byproducts, by distillation under vacuum.

In a preferred embodiment, OH groups or COOH groups that are present are reacted with monovalent isocyanates. Monoisocyanates, such as phenyl isocyanate, tosyl isocyanate, or stearyl isocyanate, are particularly suitable. These can be added in quantities as high as approximately equimolar (based on the OH groups), for example with an NCO:OH ratio from approximately 0.3:1 to 1.02:1, in particular up to 0.98:1, and react with the thermoplastic polyesters to form urethane groups. An excess of such monomeric isocyanates is to be avoided. The quantity of groups reactive with NCO can thus be reduced by way of the reaction.

The quantity of thermoplastic polyesters is intended to be 3 to 35 wt %, in particular from 5 to 25 wt %. The polyesters are preferably ones based on crystalline or semicrystalline polyester diols. A particular embodiment utilizes those linear polyesters that also comprise urethane groups. For example, suitable thermoplastic polyesters can contain a urethane group or, in particular, on average two urethane groups.

The moisture-curing melt adhesives according to the present invention can additionally contain additives. Examples thereof are tackifying resins, adhesion-promoting additives, fillers, pigments, plasticizers, stabilizers and/or catalysts, waxes, or mixtures thereof, as well as further usual adjuvants and additives.

Abietic acid, abietic acid esters, terpene resins, terpene phenol resins, phenol-modified styrene polymers, phenol-modified α-methylstyrene polymers, or hydrocarbon resins can be utilized, for example, as tackifying resins. Known organometallic and/or amine-type catalysts are suitable as catalysts in quantities up to 2%, for example the organometallic compounds of tin, of iron, of titanium, or of bismuth, such as tin(II) salts of carboxylic acids or the dialkyltin(IV) carboxylates. Antioxidants, such as the commercially usual sterically hindered phenols and/or thioethers and/or substituted benzotriazoles, or the sterically hindered amines of the HALS type, serve e.g. as stabilizers. In special compositions, plasticizers can in particular also be used. These are nonreactive plasticizers, for example naphthenic mineral oils, polypropylene oligomers, polybutene oligomers, polyisobutylene oligomers, polyisoprene oligomers, hydrogenated polyisoprene oligomers and/or polybutadiene oligomers, benzoate esters, phthalates, adipates, or hydrocarbon oils. Typical adhesion promoters are, for example, ethylene/acrylamide comonomers, polymeric isocyanates, reactive organosilicon compounds, or phosphorus derivatives; in particular, silanes that contain hydrolyzable groups are also suitable. Pigments and fillers can likewise be contained in small quantities. Waxes can be of natural origin, optionally also in chemically modified form, or of synthetic origin. Vegetable waxes, animal waxes can be used as natural waxes; mineral waxes or petrochemical waxes are also suitable. The additives can be contained in total at a proportion of up to 25 wt %.

A hot-melt adhesive according to the present invention contains, in particular, 20 to 85 wt % of at least one low-monomer prepolymer having a molecular weight below 6000 g/mol, as a reaction product of polyether diols, polyester diols, and/or polyalkylene diols and an excess of aromatic diisocyanates, 4 to 40 wt % of at least one thermoplastic polyester having a molecular weight ($M_N$) below 6000 g/mol, 3 to 35 wt % of a thermoplastic polyester having a molecular weight ($M_N$) below 6000 g/mol, as well as up to 25 wt % additives. The sum of the constituents is intended to equal 100 wt %.

A hot-melt adhesive according to the present invention is notable for a favorable viscosity, which is equal to 4000 mPas to 40,000 mPas measured at a temperature between 90° C. and 130° C. (measured per EN ISO 2555, Brookfield viscosimeter). The viscosity measured at a temperature between 90 and 120° C. is intended in particular to be from 4000 to 30,000 mPas. The NCO content of the adhesive is to be between 0.25 and 4 wt %. The viscosity can be influenced, for example, by selection of the polyesters, and the NCO content by way of the composition and quantity of the prepolymers.

By way of the use and selection of the thermoplastic polyesters, having few or no reactive groups, used according to the present invention, it is possible to ensure that the adhesive according to the present invention exhibits an advantageous low viscosity. Selection of the polyester further makes possible a lowered melting point for the adhesive, so that a suitable application viscosity can already be obtained at low temperatures. The initial adhesion and initial adhesive strength ("green strength") of the hot-melt adhesive are improved as a result of the use of portions of poly(meth)acrylates.

The hot-melt adhesive according to the present invention is suitable for adhesive bonding of a variety of substrates. In particular, the low application viscosity makes it possible to adhesively bond even substrates that are temperature-sensitive. Bonding of, for example, sensitive films, plastic, paper, and similar substrates is possible. An adhesive according to the present invention can be applied at low temperatures of, for example, less than 150° C., in particular including from 90 to 130° C. The viscosity enables good flow onto the substrate. The adhesive then cools, becomes solid, and crystallizes. Adhesion to the substrate quickly becomes established, and the adhesively bonded substrate can quickly be further processed. Because adhesives remain in the reservoir tank in the molten state for a long period of time in the context of usual processing thereof, it is advantageous that the viscosity remains constant in that context, and that the adhesive continues to be easily processable.

The hot-melt adhesive according to the present invention exhibits, after cooling, a rapid buildup of adhesion in the adhesive layer, in which context the adhesive crystallizes. Substrates bonded with a hot-melt adhesive can therefore quickly be further processed, and the final chemical crosslinking reaction under the influence of moisture can occur later. The final hardness and cohesion of the adhesive according to the present invention then becomes established. Good adhesion to a variety of substrates exists. An adhesive according to the present invention is suitable, for example, for adhesive bonding in book-binding. Adhesives according to the present invention can furthermore be used to bond packages made of paper, board, or films.

EXAMPLE 1

Comparative

In a heated agitator vessel, a reactive hot-melt adhesive composition having free isocyanate groups was manufactured from the following constituents:

| | |
|---|---|
| Polyester 1 (dodecanedioic acid and hexanediol-1,6, OH number 30) | 12.8 parts |
| Polyester 2 (adipic acid and hexanediol-1,6, OH number 30) | 14.3 |
| Acrylate copolymer (methyl methacrylate/n-butyl methacrylate copolymer, $M_N$ 34,000, $T_g$ 76° C.) | 8.0 |
| Hydrocarbon resin ($M_N$ < 1000) | 10.0 |
| Low-monomer prepolymer (made up of PPG 750 + 4,4-MDI; polyol/polyisocyanate reaction at 130° C.; NCO content: 5.9%, monomer content <0.1% after demonomerization) | 55.0 |

After mixing of the constituents while molten, the adhesive can then be decanted into moisture-tight sealable containers and used later.

NCO content (adhesive): 2.6%.

EXAMPLE 2

Comparative

Analogously to Example 1, the following were produced and mixed:

| | |
|---|---|
| Polyester 1 | 14.7 parts |
| Polyester 2 | 16.5 |
| Acrylate copolymer | 9.0 |
| Hydrocarbon resin | 10.0 |
| Low-monomer prepolymer | 50.0 |

After mixing, the adhesive can be decanted into moisture-tight sealable containers and used later.

NCO content (adhesive): 2.3%.

EXAMPLE 3

Comparative

Analogously to Example 1, the following were reacted:

| | |
|---|---|
| Polyester 1 | 14.7 parts |
| Polyester 2 (reacted in a pre-reaction with stearyl isocyanate: NCO:OH ratio 0.95:1; isocyanate groups having OH groups reacted at approx. 140° C.) | 16.5 |
| Acrylate copolymer | 11.0 |
| Low-monomer prepolymer | 48.0 |

The adhesive was decanted into moisture-tight sealable containers and can be used later.

NCO content: 2.4%.

| | Viscosity, 90° C. | after holding | Open time |
|---|---|---|---|
| Experiment 1 | 11,200 mPas | 14,200 mPas | 60 sec |

-continued

|  | Viscosity, 90° C. | after holding | Open time |
|---|---|---|---|
| Experiment 2 | 18,500 mPas | 25,700 mPas | 50 sec |
| Experiment 3 | 7400 mPas | 8800 mPas | 20 sec |

The adhesive according to the present invention has a lower viscosity, which is stable even after thermal stress.

Adhesive bonding experiments indicate faster strength for the applied adhesive film, and a shorter open time.

Test Method for Determining the "Open Time" Parameter

A heated cartridge gun (130° C.) was used to apply a hot-melt bead 3 mm thick onto a plywood panel.

Beechwood spatulas were pressed successively, at defined time intervals, into the hot bead and each briefly pushed in with a defined weight (500 g).

The spatulas were then pulled off the plywood panel. The time at which no further chip tear-out is visible on the beechwood spatula is noted as the "open time."

Determining Behavior after Holding

The adhesive is held for 8 hours at 90° C. The viscosity is then measured again.

The invention claimed is:

1. A solvent-free moisture-curing polyurethane hot-melt adhesive composition, in which the adhesive comprises the following components:
   a) 20 to 85 wt % of a polyurethane prepolymer having free isocyanate groups produced from at least one polyol from the group of polyether polyols, polyester polyols, polyalkylene polyols, and mixtures thereof and at least one polyisocyanate, the prepolymer having a monomeric diisocyanate content below 1 wt %,
   b) 4 to 40 wt % of at least one acrylate copolymer having a number-average molecular weight ($M_N$) below 60,000 g/mol,
   c) 3 to 35 wt % of at least one thermoplastic polyester having a number-average molecular weight ($M_N$) below 6000 end which comprises fewer than 1.4 NCO-reactive groups, and
   d) 0 to 25 wt % of at least one additive from the group of catalysts, resins, plasticizers, fillers, pigments, stabilizers or adhesion promoters, the sum of a) to, d) being equal to 100 wt %.

2. The composition according to claim 1, wherein the viscosity measured at a temperature between 90° C. and 130° C. is equal to 4000 mPas to 40,000 mPas (EN ISO 255).

3. The composition according to claim 1, wherein the NCO content of the composition is from 0.25 to 4 wt % NCO.

4. The composition according to claim 1, wherein polyether polyols having a functionality of approximately 2 are used as a polyol.

5. The composition according to claim 1, wherein aromatic diisocyanates are used as diisocyanates.

6. The composition according to claim 1, wherein the thermoplastic polyester is produced by reacting polyester diols with monofunctional compounds selected from carboxylic acid halides, carboxylic acid anhydrides, or isocyanates to yield a polyester having a decreased number of OH- or COOH-containing terminal groups.

7. The composition according to claim 1, wherein the thermoplastic polymer contains less than 1 group reactive with NCO groups.

8. The composition according to claim 7, wherein the thermoplastic polyester is based on aliphatic carboxylic acids.

9. The composition according to claim 1, wherein the acrylate copolymer comprises no functional groups reactive with NCO.

10. The composition according to claim 9, wherein the acrylate copolymer exhibits a glass transition temperature above 30'C.

11. The composition according to claim 1, wherein the monomer content of the prepolymers is decreased by distillation to a value below 1 wt %.

12. The composition according to claim 1, wherein the thermoplastic polymer contains substantially no reactive groups.

13. The composition according to claim 1, where a solvent-free moisture-curing polyurethane hot-melt adhesive composition, in which the adhesive comprises the following components:
   a) 20 to 85 wt % of a polyurethane prepolymer having free isocyanate groups produced from at least one polyol from the group of polyether polyols, polyester polyols, polyalkylene polyols, and mixtures thereof and at least one polyisocyanate, the prepolymer having a monomeric diisocyanate content below 1 wt %,
   b) 4 to 40 wt % of at least one acrylate copolymer having a number-average molecular weight ($M_N$) below 60,000 g/mol,
   c) 3 to 35 wt % of at least one thermoplastic polyester having a number-average molecular weight ($M_N$) below 6000 g/mol which comprises 1 to fewer than 1.4 reactive groups, and
   d) 0 to 25 wt % of at least one additive from the group of catalysts, resins, plasticizers, fillers, pigments, stabilizers or adhesion promoters, the sum of a) to d) being equal to 100 wt %.

* * * * *